(12) United States Patent
Buck

(10) Patent No.: US 7,930,240 B1
(45) Date of Patent: *Apr. 19, 2011

(54) REPOSITIONING OF MARKET INFORMATION ON TRADING SCREENS

(75) Inventor: Brian J. Buck, Chicago, IL (US)

(73) Assignee: Trading Technologies International Inc., Chicago, IL (US)

( * ) Notice: Subject to any disclaimer, the term of this patent is extended or adjusted under 35 U.S.C. 154(b) by 46 days.

This patent is subject to a terminal disclaimer.

(21) Appl. No.: 12/566,117

(22) Filed: Sep. 24, 2009

Related U.S. Application Data

(63) Continuation of application No. 11/415,407, filed on May 1, 2006, now Pat. No. 7,613,651, which is a continuation of application No. 10/609,965, filed on Jun. 30, 2003, now Pat. No. 7,587,357.

(51) Int. Cl.
*G06Q 40/00* (2006.01)
(52) U.S. Cl. .................. 705/37; 705/35; 705/36 R
(58) Field of Classification Search .................. 705/37
See application file for complete search history.

(56) References Cited

U.S. PATENT DOCUMENTS

| | | | |
|---|---|---|---|
| 4,674,044 A | 6/1987 | Kalmus et al. |
| 4,750,135 A | 6/1988 | Boilen |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,689,651 A | 11/1997 | Lozman |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,845,266 A | 12/1998 | Lupien et al. |
| 5,915,245 A | 6/1999 | Patterson, Jr. et al. |

(Continued)

FOREIGN PATENT DOCUMENTS

EP 1067471 A1 1/2001

(Continued)

OTHER PUBLICATIONS

Trading Screen, SWX Exchange, circa 1990.

(Continued)

*Primary Examiner* — Jagdish N Patel
*Assistant Examiner* — Kevin Poe
(74) *Attorney, Agent, or Firm* — McDonnell Boehnen Hulbert & Berghoff LLP

(57) ABSTRACT

As market conditions descend or ascend an axis of prices, the display of market information is repositioned, at a pre-determined rate if desired, around an item of interest. An item of interest may include the best bid price, the best ask price, the inside market, a moving average, a last traded price, a theoretical value, the result of an equation, or some other item of interest to the trader. According to the present embodiments, market information may be displayed in a region relative to an axis of prices, and when an event occurs, a repositioning signal is initialized causing the axis to be repositioned such that the item of interest is positioned at a pre-determined location in the region. The price axis can be repositioned at a fixed rate or at a dynamically variable rate.

22 Claims, 11 Drawing Sheets

U.S. PATENT DOCUMENTS

| | | | |
|---|---|---|---|
| 5,924,082 | A | 7/1999 | Silverman et al. |
| 5,924,083 | A | 7/1999 | Silverman et al. |
| 5,926,801 | A | 7/1999 | Matsubara et al. |
| 5,946,667 | A | 8/1999 | Tull, Jr. et al. |
| 5,963,923 | A | 10/1999 | Garber |
| 6,012,046 | A | 1/2000 | Lupien et al. |
| 6,014,643 | A | 1/2000 | Minton |
| 6,035,287 | A | 3/2000 | Stallaert et al. |
| 6,073,119 | A | 6/2000 | Bornemisza-Wahr et al. |
| 6,098,051 | A | 8/2000 | Lupien et al. |
| 6,131,087 | A | 10/2000 | Luke et al. |
| 6,134,535 | A | 10/2000 | Belzberg |
| 6,195,647 | B1 | 2/2001 | Martyn et al. |
| 6,272,474 | B1 | 8/2001 | Garcia |
| 6,278,982 | B1 | 8/2001 | Korhammer et al. |
| 6,282,521 | B1 | 8/2001 | Howorka |
| 6,408,282 | B1 | 6/2002 | Buist |
| 6,766,304 | B2 | 7/2004 | Kemp, II et al. |
| 6,772,132 | B1 | 8/2004 | Kemp, II et al. |
| 7,127,424 | B2 | 10/2006 | Kemp, II et al. |
| 7,228,289 | B2 | 6/2007 | Brumfield et al. |
| 7,389,268 | B1 | 6/2008 | Kemp, II et al. |
| 2002/0023038 | A1 | 2/2002 | Fritsch et al. |
| 2002/0035534 | A1 | 3/2002 | Buist et al. |
| 2002/0055899 | A1 | 5/2002 | Williams |
| 2002/0059129 | A1* | 5/2002 | Kemp et al. ............ 705/37 |
| 2002/0073017 | A1 | 6/2002 | Robertson |
| 2002/0099644 | A1 | 7/2002 | Kemp, II et al. |
| 2002/0120551 | A1 | 8/2002 | Jones, III |
| 2002/0138401 | A1 | 9/2002 | Allen et al. |
| 2003/0004852 | A1 | 1/2003 | Burns |
| 2003/0004853 | A1 | 1/2003 | Ram et al. |
| 2003/0009411 | A1* | 1/2003 | Ram et al. ............ 705/37 |
| 2003/0023542 | A1 | 1/2003 | Kemp, II et al. |
| 2003/0083978 | A1* | 5/2003 | Brouwer ............ 705/37 |
| 2003/0208424 | A1* | 11/2003 | Tenorio ............ 705/35 |
| 2004/0103054 | A1 | 5/2004 | Singer |
| 2005/0010520 | A1* | 1/2005 | Dinwoodie ............ 705/37 |
| 2006/0200405 | A1 | 9/2006 | Burns et al. |
| 2006/0259384 | A1 | 11/2006 | Schluetter et al. |
| 2006/0259404 | A1 | 11/2006 | Brumfield et al. |
| 2006/0259411 | A1 | 11/2006 | Burns |
| 2006/0265304 | A1 | 11/2006 | Brumfield et al. |
| 2006/0271475 | A1 | 11/2006 | Brumfield et al. |
| 2007/0136182 | A1* | 6/2007 | Ketchum et al. ............ 705/37 |

FOREIGN PATENT DOCUMENTS

| | | | |
|---|---|---|---|
| WO | WO9114231 | A1 | 9/1991 |
| WO | WO9526005 | A1 | 2/1995 |
| WO | WO9849639 | A1 | 11/1998 |
| WO | WO9919821 | A1 | 4/1999 |
| WO | WO9930259 | A1 | 6/1999 |
| WO | WO9953424 | A1 | 10/1999 |
| WO | WO0052619 | A1 | 9/2000 |
| WO | WO0062187 | A2 | 10/2000 |
| WO | WO0062187 | A3 | 10/2000 |
| WO | WO0116830 | A1 | 3/2001 |
| WO | WO0116852 | A2 | 3/2001 |
| WO | WO0116852 | C1 | 3/2001 |
| WO | WO0122315 | A2 | 3/2001 |
| WO | WO0122315 | A3 | 3/2001 |
| WO | WO0127843 | A1 | 4/2001 |
| WO | WO0165403 | A2 | 9/2001 |
| WO | WO0065510 | A1 | 11/2001 |
| WO | WO0188808 | A1 | 11/2001 |
| WO | WO0229686 | A1 | 4/2002 |
| WO | WO0248945 | A1 | 6/2002 |
| WO | WO02059815 | A1 | 8/2002 |
| WO | WO02069226 | A2 | 9/2002 |
| WO | WO02079904 | | 10/2002 |
| WO | WO02093325 | A2 | 11/2002 |
| WO | WO02103601 | A | 12/2002 |
| WO | WO03090032 | A2 | 10/2003 |
| WO | WO03090032 | A3 | 10/2003 |

OTHER PUBLICATIONS

Expanding futures and options trading around the world, around the clock, GLOBEX, circa 1989.

Hansell, The computer that ate Chicago, Institutional Investor, Feb. 1989.

Globex Report: An update on the CME Global electronic exchange, Feb. 10, 1989.

NYMEX Access Documents, New York Mercantile Exchange, Feb. 29, 1992.

CATS Traders' Manual, Toronto Stock Exchange, Sep. 30, 1977.

Market Watch, Trading Screen, date not available.

Grummer, Peake, Sellers, Preliminary Feasibility Study, Bermudex Ltd., Nov. 1980.

Peake, Mendellson, The ABCs of trading on a national market system, Appendix C of Preliminary Feasibility Study, Bermudex Ltd., Sep. 1997.

Peake, The last 15 meters, Appendix E of Preliminary Feasibility Study, Bermudex Ltd., Jun. 15, 1997.

Declaration of Brendan Bradley in Case No. 04 C 5312, Nov. 18, 2004.

Memorandum Opinion Published Feb. 9, 2005, of Judge James B. Moran in Case No. 04 C 5312.

APT Brochure, LIFFE Exchange, circa 1990.

Trading Screen, INTEX of Bermuda, circa 1984.

Weber, Information Technology in the Major International Financial Markets, Apr. 7, 1993.

Trading Screen, TIFFE Exchange, circa 1989-1990.

Trading Screen, MEFF Exchange, circa 1990.

Cavaletti, Order Routing Article, Futures Magazine, Feb. 1997.

Aurora Article, CBOT, circa 1989.

USPTO Presentation, NASDAQ, Nov. 8, 2001.

Kharouf, A Trading Room with a View, Futures, 27, Nov. 11, 1998.

www.tradingtechnologies.com/product/xtrade_full.html (viewed May 22, 2001).

One Click Trading Options, Trading Technologies, circa 1998.

* cited by examiner

| E/W 1002 | BidQ 1004 | AskQ 1006 | Prc 1008 |
|---|---|---|---|
|  |  | 5 | 134 |
|  |  | 30 | 133 |
|  |  | 20 | 132 |
|  |  |  | 131 |
|  |  |  | 130 |
|  | 35 |  | 129 |
|  | 70 |  | 128 |
|  |  |  | 127 |
|  | 25 |  | 126 |
|  |  |  | 125 |
|  | 10 |  | 124 |
|  |  |  | 123 |
|  |  |  | 122 |
|  |  |  | 121 |
|  |  |  | 120 |

FIG. 10

REPOSITIONING OF MARKET INFORMATION ON TRADING SCREENS

RELATED APPLICATIONS

This application is a continuation of U.S. patent application Ser. No. 11/415,407 filed on May 1, 2006, which is a continuation of U.S. patent application Ser. No. 10/609,965, which was filed on Jun. 30, 2003, the contents of which are fully incorporated herein by reference.

FIELD OF INVENTION

The present invention is directed towards electronic trading, and more specifically, is directed to repositioning market information for display on a trading screen and is directed to trading in such a display.

BACKGROUND

Typically, an electronic exchange provides an automatic matching process between traders, or more specifically, between buyers and sellers. Traders are connected to an electronic exchange by way of a communication link to facilitate electronic messaging between themselves and the exchange. Market information, which is included in the messaging, is received and displayed to the traders on their trading screens. Upon viewing the market information, traders can take certain actions including the action of sending buy or sell orders to the exchange.

In general, when a buy order or a sell order is sent to an electronic exchange, the exchange's computer logic checks the conditions associated with the order, for example price and quantity, and determines if a match exists. If a match does not exist, the exchange's computer logic prioritizes the order with other orders of the same price in the exchange's electronic order book. When the order conditions are satisfied in the market, or equivalently, a match exists, a trade occurs.

In many instances, spotting an opportunity in the market and capitalizing on it before the competition often separates those traders who are successful from those traders who are not. An important component in capitalizing on an opportunity involves the efficient assimilation of market information. Most conventional trading applications receive electronic messaging and attempt to display the market information in some particular fashion to the trader. Until recently, however, market information was simply displayed on a trading screen in a manner similar to how it was received from the exchange without much customization or formatting. Now developers are beginning to create sophisticated trading screens to interface electronic exchanges. Depending on the actual layout, however, some trading screens are more successful than others in displaying market information to the traders.

To be a successful trader in electronic markets, one must be able to assimilate large amounts of market information and react accordingly more quickly than other competing market participants. It is therefore desirable to improve the way market information is displayed to the trader and to improve the efficiency of order entry by using such displays.

BRIEF DESCRIPTION OF THE DRAWINGS

FIG. 10 shows an example trading interface with a price axis used in displaying market information wherein the moving average is currently centered in the display region;

DETAILED DESCRIPTION

Figure 1:
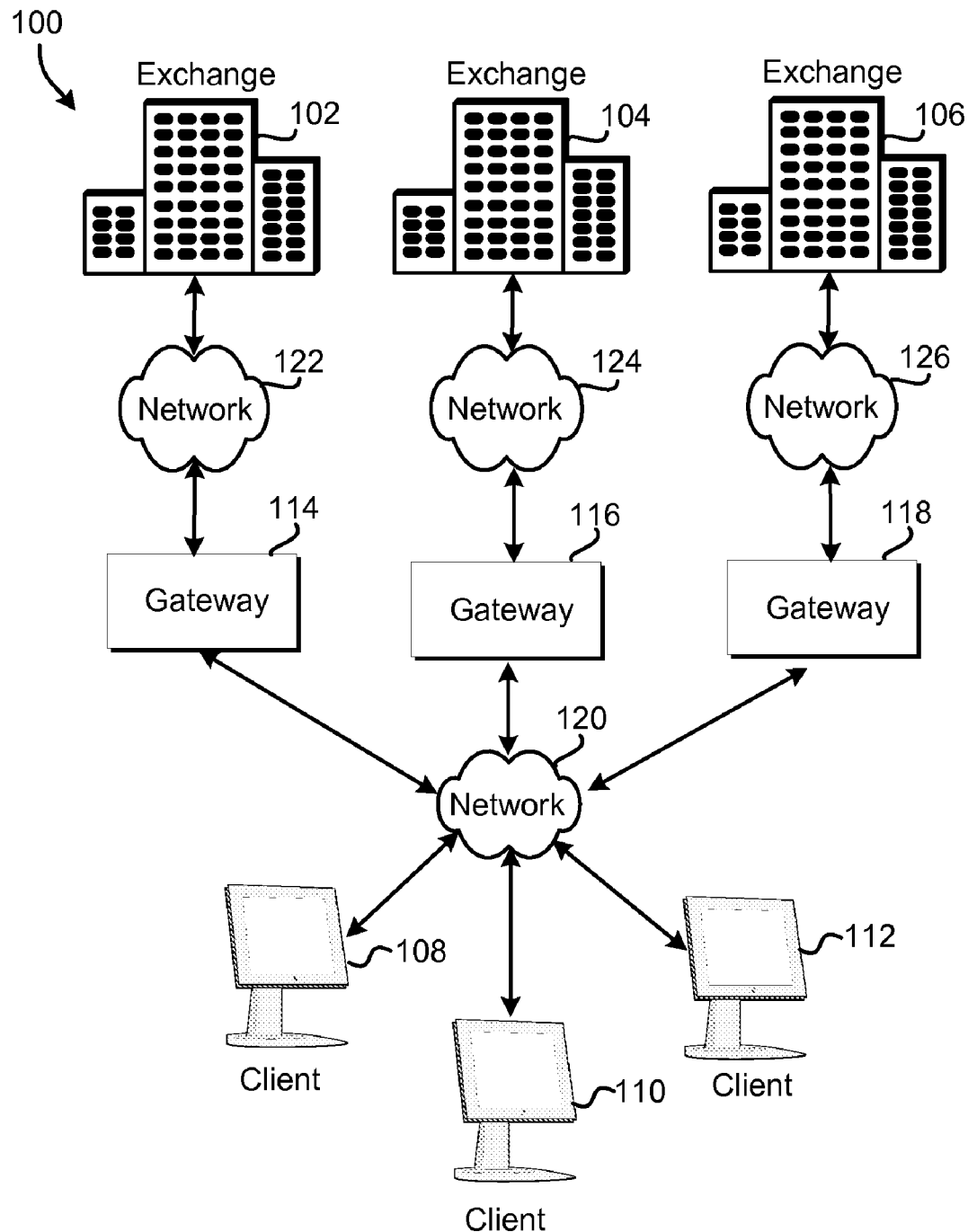
FIG. 1 is a block diagram that illustrates an electronic trading system showing an example network connection between client devices and electronic exchanges.

The present embodiments build on the price axis and re-centering concepts described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display Of Market Depth And Price Consolidation," filed on Oct. 5, 2001, U.S. patent application Ser. No. 10/125,894, entitled "Trading Tools for Electronic Trading," filed on Apr. 19, 2002, and in U.S. patent application Ser. No. 10/376,417, entitled "A System and Method for Trading and Displaying Market Information in an Electronic Trading Environment," filed on Feb. 28, 2003, the contents of each are incorporated by reference herein.

I. OVERVIEW

The way in which market information is displayed to the trader is vital to the success of trading electronically. If the information displayed is confusing or does not provide traders with what they need, their performance can degrade. Therefore, a trading interface is provided that takes advantage of a computer's graphics capabilities to make the display of market information easier to visualize and analyze. As a result, traders can make better visual judgments to detect market trends.

In particular, a trader may be interested in a specific item of interest. An item of interest may include the best bid price, the best ask price, the inside market, a moving average, a last traded price, a theoretical value, the result of an equation, or some other item of interest to the trader. Then, market information may be displayed in a region relative to an axis of prices, and upon receiving a repositioning signal, the axis is repositioned such that the selected item of interest is centered in the region. Repositioning the price axis also causes the market information to move concurrently.

The repositioning signal may be initialized by an event. An event may include any change in value of the item of interest. For example, a trader might select as an item of interest a 10-day moving average of the last traded price. When the 10-day moving average changes from one value to another, the signal is initialized causing the price axis to be repositioned. Alternatively, an event may include any changes in value of the item of interest where the magnitude of the change falls outside of a particular tolerance level, which is defined by one or more limits. Using the 10-day moving average example to illustrate this alternative embodiment, assume that the 10-day moving average has to change by "5" price units before the signal is initialized causing the price axis to be repositioned. Of course, any number of limits may be set to obtain the appropriate tolerance level(s).

In addition, the price axis may be repositioned at a particular rate. The rate is the speed at which the price axis is shifted such that the display screen goes from displaying one view of the price axis to another view. It is envisioned that the repositioning may occur at any rate. For example, at one end of the spectrum, the rate may be instant (or near instant), and at the other end of the spectrum, the rate may be gradual such that the price axis and indicators smoothly glide from one view to another, so as not to distract the trader and to avoid errors in order entry, if order entry is provided. One or more rates may be chosen by the trader or hard-coded, which might depend on the options given by the applications software. Also, a rate may be dynamically variable or fixed.

The price axis may be repositioned such that the selected item of interest is centered in a region. Of course, depending on the granularity of the displayed price scale and the item of interest, the item of interest may not always lie directly in the center of the region. Additionally, it also envisioned that the price axis may be repositioned in a smooth and continuous fashion so that the item of interest can be directly centered or directly positioned at the desired destination location. This is particularly useful when the item of interest is associated with a price level that can fall between two marked price levels. Also, if programmed to do so, the item of interest may be positioned in a location different from the center of the region. Because the price axis can be repositioned along the price axis in a smooth and continuous fashion, the item of interest can be positioned in an infinite number of locations along the price axis.

One skilled in the art of trading would appreciate the benefits of the present embodiments and could recognize its advantages from the teachings described herein. Some advantages include the efficient market information assimilation by the trader and minimal memory load on the trader. In addition, the present embodiments relieve the need to read and interpret strictly alphanumeric data by displaying market information graphically along a price axis while placing particular emphasis on the item of interest. Yet another advantage is that the repositioning rate may be set to a slow enough speed so as not to distract the trader when a repositioning occurs. A slow repositioning rate may augment the assimilation of market information by enhancing the movement of the market according to some item of interest. Moreover, the price axis may be repositioned in a continuous manner such that the price axis and indicators smoothly glide from the one view to another view. In addition to displaying market information, the format of the display may be directly linked to data entry including order entry. These advantages and more become readily apparent from reading the description below.

The present embodiments now will be described more fully hereinafter with reference to the accompanying Figures. The present embodiments may be embodied in many different forms and should not be construed as limited to the embodiments set forth herein.

II. PREFERRED SYSTEM ARCHITECTURE

FIG. 1 is a block diagram that illustrates an electronic trading system 100 in accordance with the present embodiments. The system 100 includes one or more exchanges 102, 104, 106 and one or more client devices 108, 110, 112. Intermediate devices such as gateways 114, 116, 118, routers (not shown in the Figure for sake of clarity), and other such types of network devices may be used to connect network 120 to networks 122, 124, 126 so that client devices 108, 110, 112 and exchanges 102, 104, 106 can communicate market information. It should be understood that the present embodiments are not limited to any particular system configuration. For example, networks 122, 124, and 126 could represent the same network, network 120 could represent the same network as networks 122, 124, and 126, or client devices 108, 110, 112 could connect separately to gateways 114, 116, 118. Of course, the present embodiments may be implemented on many other system configurations.

A. Exchange

Exchanges 102, 104, 106 may represent any exchange that participates in electronic trading. The London International Financial Futures and Options Exchange (LIFFE), the Chicago Board of Trade (CBOT), the New York Stock Exchange (NYSE), the Chicago Mercantile Exchange (CME), the Exchange Electronic Trading ("Xetra," a German stock exchange), and the European Exchange ("Eurex") are examples of exchanges that participate in electronic trading. Exchanges 102, 104, 106 might also refer to other facilities, which include basic to complex systems that automatically match incoming orders. These example exchanges and other exchanges are well known in the art. Communication protocols required for connectivity to one of these exchanges are also well known in the art.

Exchanges 102, 104, 106 allow traders to log onto a market to trade tradable objects. As used herein, the term "tradable objects," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable object, such as a class of tradable objects.

An exchange 102, 104, 106 can implement numerous types of order execution algorithms, sometimes the type of algorithm depends on the tradable object being traded. Preferably, the preferred embodiments can be adapted by one skilled in the art to work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each exchange 102, 104, 106 preferably provides similar types of information to subscribing client devices 108, 110, 112. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, exchanges 102, 104, 106 can offer other types of market information such as the last traded price (LTP), the last traded quantity (LTQ), and order fill information.

B. Gateway

Gateways 114, 116, 118 are devices such as a mainframe, super minicomputer, minicomputer, workstation, or microcomputer that connect network 120 to networks 122, 124, 126 so that market information can be successfully passed between client devices 108, 110, 112 and exchanges 102, 104, 106. Gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, 118 may have one or more servers to support the data feeds, such as a price server for processing price information, an order server for processing order information, and a fill server for processing fill information. A trader at one of client devices 108, 110, 112 can subscribe to price information, order information, and fill information for a particular market hosted at exchanges 102, 104, 106. Gateways 114, 116, 118 also receive transaction information, such as orders, order changes, queries, etc. from client devices 108, 110, 112 and forward that information to corresponding exchanges 102, 104, 106.

C. Client Device

Client devices 108, 110, 112 are devices that provide an interface for traders to trade at one or more markets listed with one, some, or all of exchanges 102, 104, 106. Some examples of client devices include a personal computer, laptop computer, hand-held computer, and so forth. Client devices 108, 110, 112, according to the preferred embodiments, include at least a processor and memory. The processor and memory, which are both well-known computer components, are not shown in the Figure for sake of clarity. Preferably, the processor has enough processing power to handle and process the various types of market information. Of course, the more market information that is received and processed, the more processing power is preferred. However, any present day processor has enough capability to perform at least the most basic part of the present invention.

Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Client devices 108, 110, 112 receive market information from any of exchanges 102, 104, 106. Market information is displayed to the trader(s) on the visual output device or display device. Upon viewing the market information or a portion thereof, a trader may wish to send orders to an exchange, cancel orders in a market, change orders in a market, query an exchange, and so on. To do so, the trader may input various commands or signals into the client device 104, for example, by using one or more conventional means for inputting information such as typing into a keyboard, inputting commands through a mouse, or inputting commands or signals through some other well-known multi-purpose input device.

Upon receiving one or more commands or signals, client devices 108, 110, 112 preferably generate transaction information. For instance, a trader may press a key or button to initiate an order to buy a tradable object. Then, transaction information would include an order to buy a particular quantity of the tradable object at a particular price. There are many different types of messages and/or order types that can be submitted to an electronic exchange, all of which may be considered various types of transaction information. Once generated, transaction information is sent from client device 104 to host exchange 102 over network(s) 120, 122, 124, 126.

Figure 2:
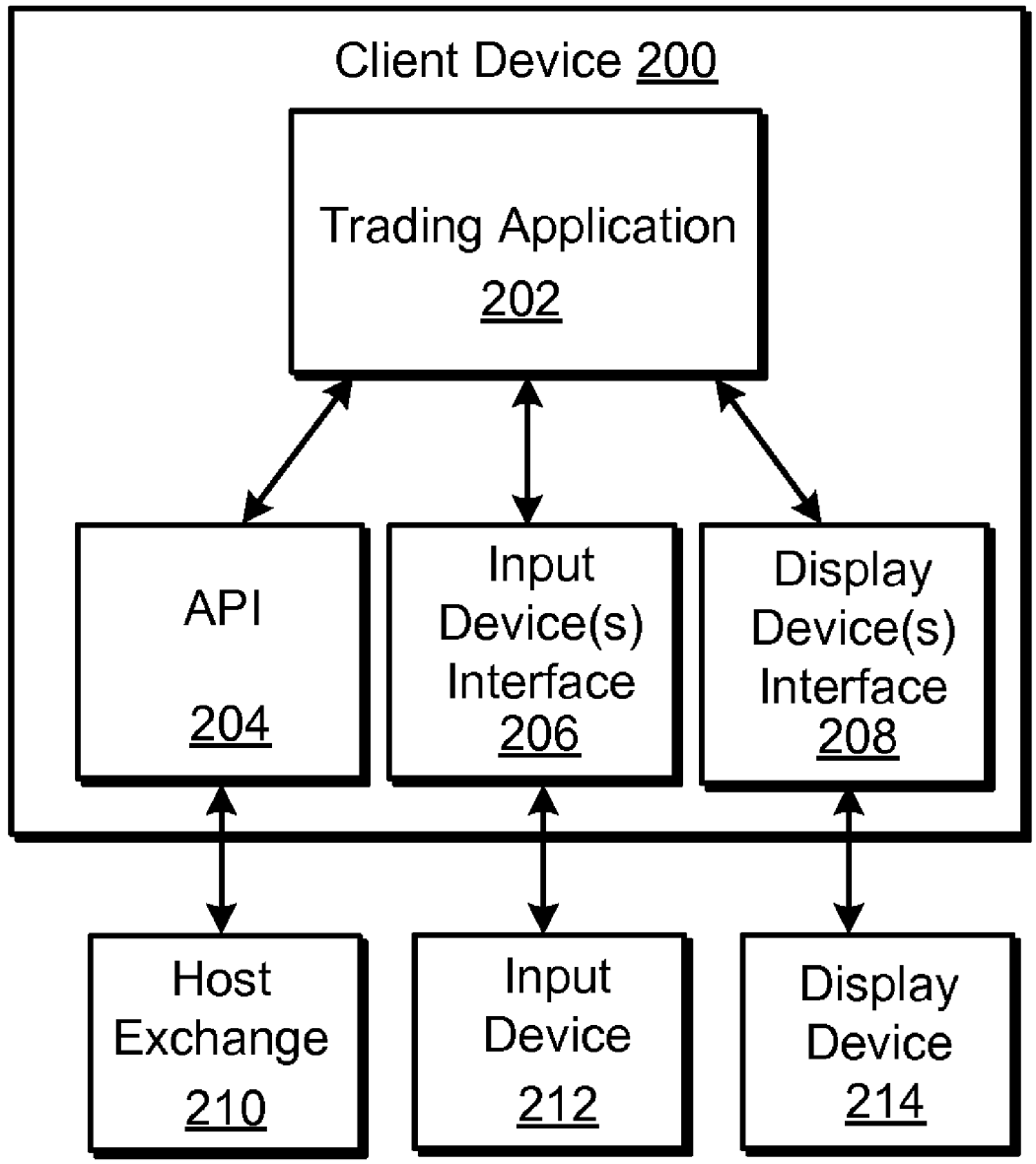
FIG. 2 is a block diagram that illustrates a software/hardware overview of an example client device for use in a system such as shown in FIG. 1.

FIG. 2 shows an overview of client device 200 which may be similar to the type of client devices 108, 110, 112 shown in FIG. 1. Client device 200 can be any particular type of computing device, examples of which were enumerated above with respect to the client devices. According to the preferred embodiments, client device 200 has trading application 202 stored in memory that when executed it may arrange and display market information in many particular ways, usually depending on how the trader prefers to view the information. Preferably, trading application 202 has access to market information through API 204 (or application programming interface) and trading application 202 can forward transaction information to exchange 210 via API 204. Alternatively, API 204 could be distributed so that a portion of the API rests on the client device 200 and a gateway, or at the exchange 210.

III. EVENT DRIVEN REPOSITIONING OF A PRICE AXIS

Figure 3:
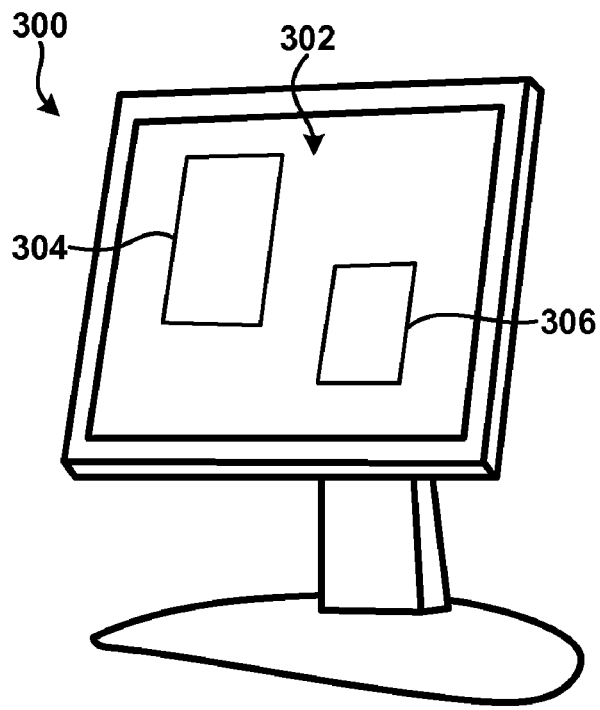
FIG. 3 is a diagram of a flat-panel display and its screen to illustrate how a trading interface of the present embodiments may be viewed in a window by a trader.

FIG. 3 shows an example monitor 300 and display screen 302 for use with the present embodiments. In the Figure, monitor 300 resembles an LCD-based or a gas plasma-based flat-panel often used with desktop computers or docking stations for laptop computers. However, any monitor or display device (e.g., display device represented by block 214 in FIG. 2) on which images may be generated can be used. Therefore, it should be understood that the present embodiments are not limited to any particular type of display device, but for sake of illustration some example display devices include a cathode ray tube (CRT), a projector or use of multiple projectors to create a tiled display with overlapping projection, a display made up of light emitting diodes (LEDs), or they include some other type of known technology. Monitor 300 and display screen 302 may range in size from very small to accommodate a small hand-held device to very large to accommodate a large public display.

Display screen 302 is the visual output of monitor 300. In general, display screen 302 remains static while other elements on the screen 302 can change. For example, window borders 304, 306 on the display screen 302 can change depending on the user's preferences. Window borders 304, 306 surround portions of the display screen 302 that can contain its own document or message and may be re-sized or moved around the display screen 302. According to some operating systems like Microsoft Windows® and its variations, the display screen 302 can be divided into more than one window, each of which has its own boundaries and can contain different market information (or another view into the same market). For sake of illustration, two windows formed by window borders 304, 306 are shown in display screen 302, although any number of windows may be displayed. In addition, the trading windows defined by borders 304, 306 may be made smaller or larger and dragged across display screen 302 to suit the needs of the trader.

Market information may be displayed in a window relative to an axis of prices. For example, market information can be displayed in either window defined by borders 304 or 306, relative to an axis of prices associated with that window. More specifically, a window may have one or more regions that are aligned with a price axis. For example, a region might contain indicators that represent bid information and another region might contain indicators that represent ask information. The bid region and the ask region may be aligned with the axis of prices. Then, when changes in the market occur, the trader can visualize them by watching indicators in the regions move along the price axis. For a better understanding of the price axis and how it relates to particular regions, the reader may refer to the above-incorporated patent applications. Additionally, trading window examples, which show a price axis, are described herein with respect to FIGS. 6-12. Trading window examples shown in FIGS. 6-12 may also include order entry capabilities, however, it should be understood that the trading interface of the present embodiments could be used only for displaying market information.

Figure 4:
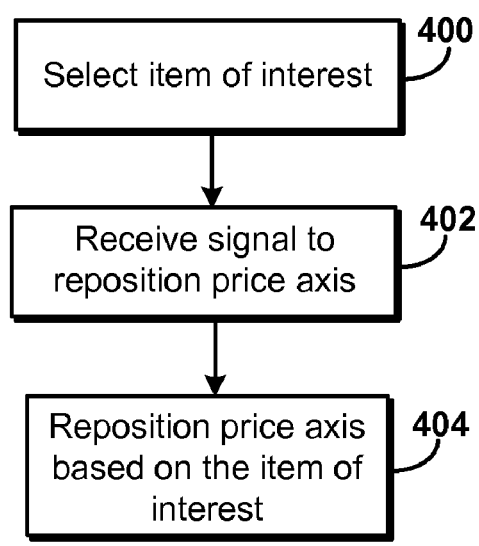
FIG. 4 is a flowchart that illustrates an example process of repositioning a price axis to center an item of interest in a display region.

FIG. 4 is a flowchart that illustrates a process for repositioning a price axis to center an item of interest in a region. The flowchart shown in FIG. 4 provides an illustrative description for repositioning a price axis, and more or fewer steps may be included in the flowchart, and/or steps may occur in one or more orders that are different from the order of steps shown in the Figure. Some example variations are included in the description of the various blocks shown in the Figure.

At block 400, a trader can preferably select an item of interest. An item of interest may include the best bid price, the best ask price, the inside market (both the best bid price and the best ask price), a moving average, a last traded price, a theoretical value, or any other type of indicator(s) that a trader may find of particular interest. An item of interest may be a value that is received from an exchange through its electronic messaging. For instance, some exchanges provide, among other things, the inside market in its electronic messaging or price feed. It is also possible that the item of interest has a value that is equal to the result of an expression of an equation or algorithm, where the result can be equal to the expression in the equation, greater than the expression in the equation, or less than the expression in the equation, depending on the operator used. For example, a 5-hour moving average of the inside market is an example of a solution to an equation where the algorithm averages the inside market over the previous five hours. If there is more than one item of interest, then it might be desirable to allow a trader to select one item of interest from a list of options.

If tracking more than one item of interest is preferred, then the present embodiments may be programmed to allow for selection of more than one item of interest at any given time. For example, a trader might be interested in the inside market and a 1-month moving average of the inside market. Then, the present embodiments can reposition the price axis based on the inside market and the 1-month moving average of the inside market.

At block 402, an event occurs which triggers the repositioning signal to reposition the price axis. An event may include any change in value of the item of interest(s). An example was given earlier with respect to a 10-day moving average. As soon as the 10-day moving average changed from one value to the next, the signal was initialized and the price axis was repositioned. The 10-day moving average is an example of an item of interest being generated by an equation. For another example of an event, assume that a trader selected the last traded price as the item of interest and it was last viewed at "105." Shortly thereafter, the last traded price changed to "107." The change from "105" to "107" may be a programmed event that triggers the repositioning signal to cause a repositioning of the price axis. This last example showed a change from a whole number to another whole number; however, an event might also include an instance where the item of interest changed in only fractional increments. According to the preceding example, the value of the item of interest changing from "105" to "105.1" is one illustration. This is also assuming that the software tracks (or the exchange provides) the last traded price in "0.1" increments. In addition, an event may be caused by a change equal to the smallest increment of change possible by the item of interest.

Figure 5:
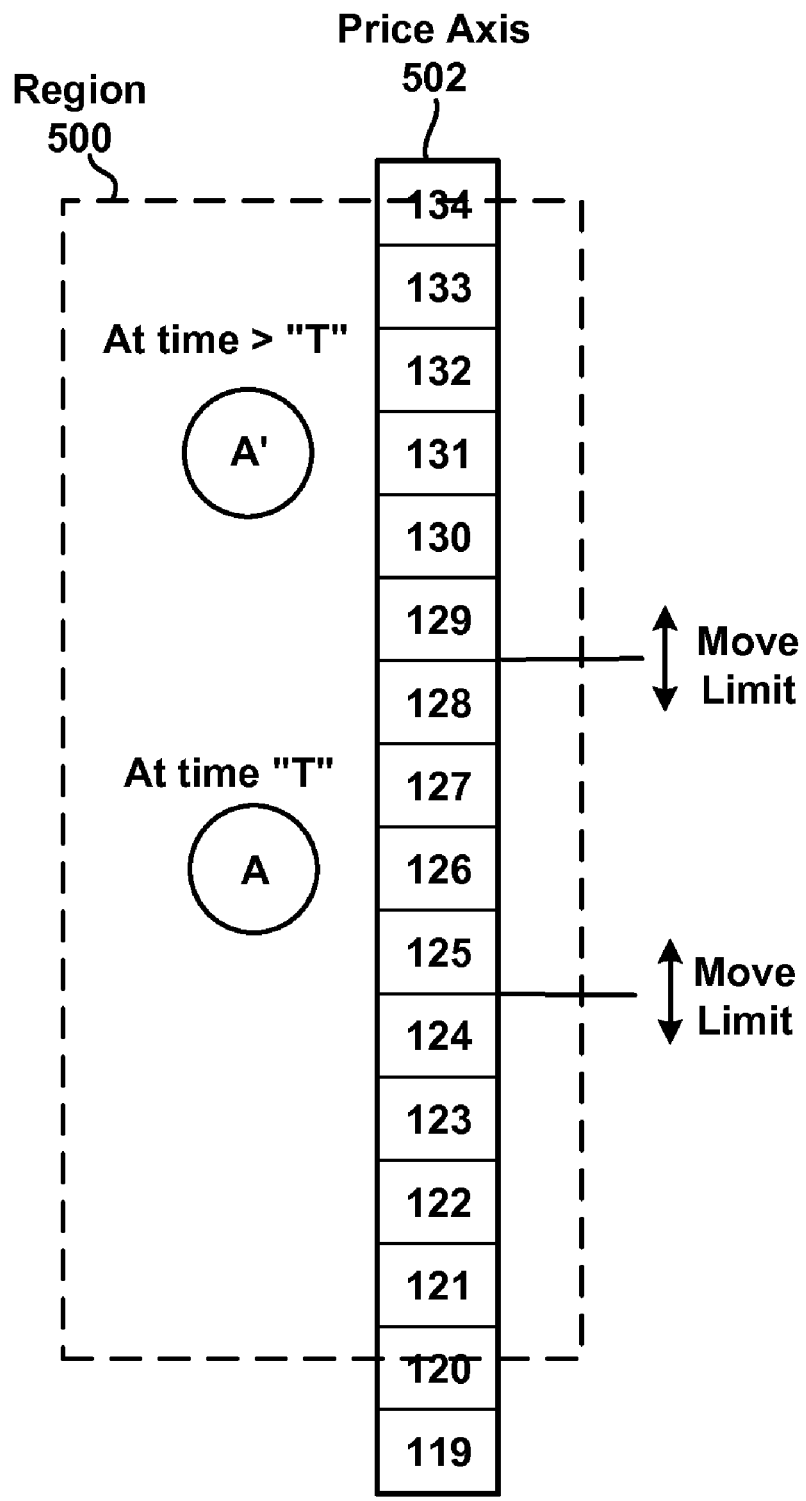
FIG. 5 shows a price axis with example prices and a generic item of interest to illustrate the use of limits.

There might be instances when a trader does not want the price axis to be repositioned every time a change to the item of interest occurs. Therefore, it might be advantageous to provide additional inputs that can be used to determine when the price axis is to be repositioned. FIG. 5 shows an example to illustrate the possibilities of additional inputs and how they may be applied in accordance with the present embodiments.

In general, FIG. 5 shows region 500 with price axis 502 having prices from "119" to "134" in one-tick increments and a generic item of interest referred to as "A." FIG. 5 also shows a limit set at "125" and a limit set at "128." The limit(s) may be chosen by the trader or hard coded in the software whichever is preferred. If the limit is chosen by the trader, an entry field may be provided to enter in the limits. Alternatively, a slider bar could be provided. Then, for each limit a slider bar may be dragged up or down along the price axis to indicate the number of units of movement that are acceptable by the item of interest before the price axis is repositioned. According to the example shown in FIG. 5, the limits may be set to provide more tolerance in movement by the item of interest. When the item of interest "A" moves outside/beyond one of those limits, the price axis is repositioned. Additionally, the limits may be set so that the price axis is repositioned every time the item of interest moves or changes.

It should also be understood that any number of limits might be applied to accommodate various levels of reposition rates. For example, a limit could be placed at "128," "131" and "off-screen" such that when the value of the item of interest falls between "128" and "131" the price axis is repositioned at one-rate, when the value falls between "131" and "off-screen" the price axis is repositioned at a second-rate, and when the value is greater than "off-screen" the price axis is reposition at a third-rate. The number of combinations of limits and rates that can be set according to the present embodiments are virtually endless.

If more than one item of interest was selected, then an event occurs when one of the items of interest changes in value or when one of the items of interest moves outside of a boundary, whichever mode is used. Also, it might be possible that each item of interest uses a different mode. For example, an event might occur when the value of one item of interest changes and another event might occur when the value of a second item of interest moves outside of a boundary. If the value of both items of interest changes or moves simultaneously, then each change or movement may be programmed to cause an event. Alternatively, when the value to both items of interest changes or moves simultaneously, only the larger change or movement causes an event. Of course, these concepts may be equally applied to situations when more than two items of interest are selected.

It should also be understood that the repositioning signal might be triggered by a trader wishing to manually repositioning the price axis by selecting a repositioning button or icon. If this option is provided, it is preferable that the process of manually repositioning the price axis can occur at any time the repositioning button or icon is selected.

At block 404, the price axis is repositioned in response to the signal. The signal can simply be the occurrence of an event. For instance, flag bits may be used to signal when the price axis is repositioned. The price axis is preferably repositioned such that the item of interest is centered in a region, or if desired, the price axis is repositioned such that the item of interest is positioned at another location that is different from the center. If the location is different from the center, the trader could select the location that the item of interest should be positioned. Note that it is also possible for a second event to occur while the price axis is being repositioned in response to the first event. In such circumstances, it is preferred that the price axis is repositioned according to the second event. Therefore, repositioning the price axis to a destination position based on the most recent event is preferred as it takes into account the most recent value of the item of interest.

Referring again to FIG. 5, the concepts set forth in blocks 402 and 404 are illustrated. In this instance, assume that at some time greater than time "T" the item of interest A jumped to A', which is at a price level of "131." However, price level "131" is outside of the upper limit, or in this example, "128." As a result, the price axis would be repositioned so that the A' is positioned back into the center of the region 500 (or some other designated reference point if not in the center of the region).

So far, when a designated event occurs, a repositioning signal is initiated and the price axis is repositioned. In addition, the price axis may be repositioned at a designated rate. Previously stated, the rate is the speed at which the price axis is shifted such that the window goes from showing one view of the price axis to another view. The rate can include a range of speeds from instantaneously repositioning the price axis to very slowly repositioning the price axis. The rate may be defined as the number of pixels per time unit or by some measurement of speed. Although not shown in FIG. 4, the step of selecting a rate (or rates, if more than one rate is used) may be added to the process.

According to the present embodiments, the rate can be variable or fixed. If the rate is variable, then as the price axis is repositioned, the speed at which the repositioning occurs may dynamically change. For example, the rate of repositioning might be fast and as the item of interest moves closer to the destination position, the rate might decrease. The variable rate might be set up by a trader or through some specific algorithm (e.g., if the value is "off-screen" then the price axis is moved at 200 pixels per second otherwise the price axis is moved at 50 pixels per second). If the rate is fixed, then as the price axis is repositioned, the speed at which the repositioning occurs will not change regardless of whether the change in value was large or small.

According to another embodiment, the rate is determined based on a certain parameter or parameters. For example, parameters might include a minimum rate while the item of interest is on-screen, a minimum rate while the item of interest is off-screen, a maximum rate while item of interest is on-screen, a maximum rate while item of interest is off-screen, or the distance from the current position to the destination, with a smooth rate destination. To illustrate, if the item of interest has moved off-screen, then the rate might be faster than if the item of interest had moved a little off-center. The present embodiments are preferably flexible enough to allow the trader to set up various limits and rates (variable/fixed) that correspond to those limits.

The reposition rate may also be adjustable based on other parameters such as maximum acceleration of the rate. This parameter can be employed when the display is being positioned and another signaling event occurs while the positioning is still occurring, or if the other factors in a variable rate of repositioning have changed. Either situation would have an old rate and a newly calculated rate, perhaps even in the opposite direction. The maximum acceleration of the rate may be used to smoothly transition between the two rates.

Other enhancements may be used to provide the trader with increased flexibility in market views. For example, the reposition may be accompanied by a zoom in/zoom out of the market, or similarly, a change of price scale. Zooming in and zooming out may be useful during periods of rapid market movement. In addition, this self scaling feature could aid the viewer by zooming out on the price axis to prevent the market from "running off the screen," and as the item of interest is moved closer to its destination position the display could zoom back in to either the previous zoom level or a preset zoom level of the price axis.

In addition to zooming out and zooming in, the present embodiments might link the display to a second display of the same market. The display of the second market could use a larger scale with graphical means depicting the space occupied by the primary display. In particular, the second display could show an overview of the market, while the primary display could show a more detailed look at the market information near the item of interest, or vice versa.

Sometimes a trader might have an interest in more than one market. For instance, the trader might have an interest in trading spreads. A spread has two or more underlying tradable objects. To view the activity of each underlying tradable object market, the trader might have a trading window open on a screen for each of them. Each window may have a separate price axis against which market information is displayed. According to the present embodiments, the price axis of each window may be repositioned when a specified event occurs. For example, an event might occur in one market that causes the price axes of all other associated windows to reposition. To illustrate, assume that a trader is trading a two-legged spread. The trader has three windows displayed on the screen; one window for the spread market, a second window for the buy leg and a third window for the sell leg. Assume also that a 1-hour moving average of the spread inside market is the item of interest. When the 1-hour moving average changes, the price axis in the first window is repositioned. Moreover, the price axes of the second and third windows are also repositioned to display relevant market views. Spread trading is described in U.S. patent application Ser. No. 10/137,979, entitled "System and Method for Performing Automatic Spread Trading," filed on May 3, 2002. Of course, the present embodiments are not limited to spread trading, but can be used anytime when markets are preferably grouped together.

Some additional examples are now provided to illustrate some concepts of the present embodiments.

A. Example 1

Figure 6:
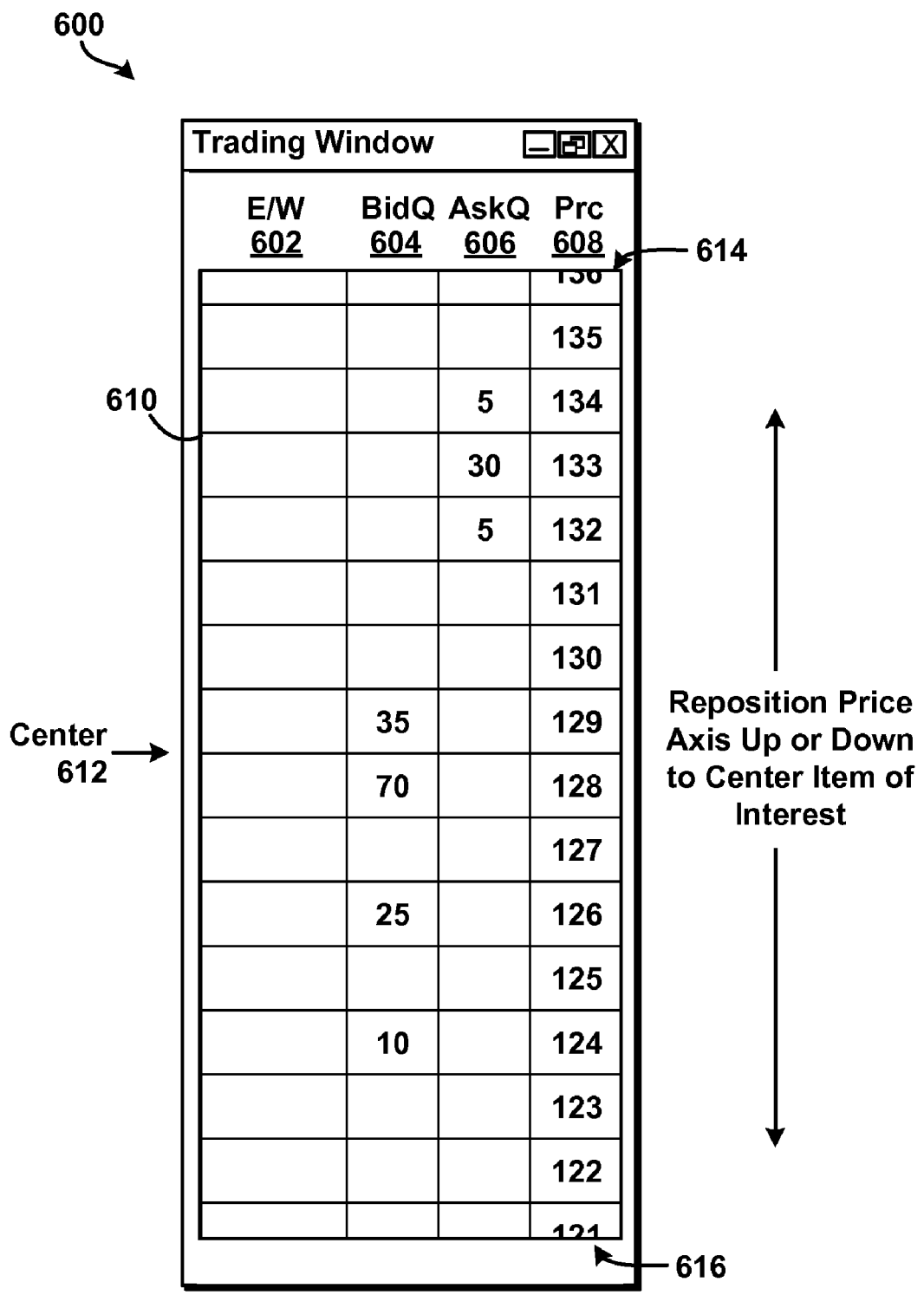
FIG. 6 shows an example trading interface with a price axis such that the price axis may be moved in a smooth and continuous fashion to position items of interest.

FIG. 6 shows a trading interface 600 for displaying market information along a price axis 608 in region 610. Price axis 608 and variations of price axis 608 are described in the above incorporated U.S. patent application Ser. No. 09/590,692, entitled "Click Based Trading With Intuitive Grid Display of Market Depth," and in U.S. patent application Ser. No. 10/376,417, entitled "A System and Method for Trading and Displaying Market Information in an Electronic Trading Environment."

As a brief overview, price values situated along the price axis 608 are statically displayed. That is, the price levels do not normally change positions unless a re-centering, repositioning or other user initiated command is received. The indicators displayed in other regions, such as bid quantity display region 604 and ask quantity display region 606, are dynamic. For example, they move up and down along the price axis 608 to reflect the inside market and/or market depth for the given tradable object. So, for example, when the inside market moves up in price, quantities populate the appropriate price levels which using the preferred display shows that the inside market has just moved up. Similarly, when the inside market moves down in price such that quantities populate the appropriate price levels which shows that the inside market has just moved down. Additionally, quantity values displayed in the bid and ask regions 604, 606 are dynamic in the sense that the actual quantity itself may go up or down in magnitude at a particular price level. Regardless of whether the price axis is straight or curved, horizontal or vertical (or oriented any other angle), the display and trading methods of the present embodiments preferably allow the trader to better visualize movement in the market more quickly.

According to FIG. 6, the movement of the price axis is smooth and continuous. That is, the price axis can be variably positioned in any location to center the item of interest in a region and not have to "snap" from one marked price level to another marked price level. To illustrate, assume for the moment that the item of interest is the last traded price that is currently at "128.5," which is not a marked price level. As a result, the price axis 608 is positioned such that the last traded price is directly in the center 612. Notice that only partial views of the price "136" at 614 and price "121" at 616 are shown. This is because the trading interface according to this embodiment allows smooth and continuous movement of the price axis, and therefore, a partial display of price levels along price axis 608 may result.

In addition, it should be understood that the actual prices do not necessarily have to be displayed. According to this embodiment, it is possible to center the market information on the last traded price without the need for displaying the price levels. The bid quantities and the ask quantities would remain in the same positions in their regions 604, 606.

B. Example 2

Figure 7:
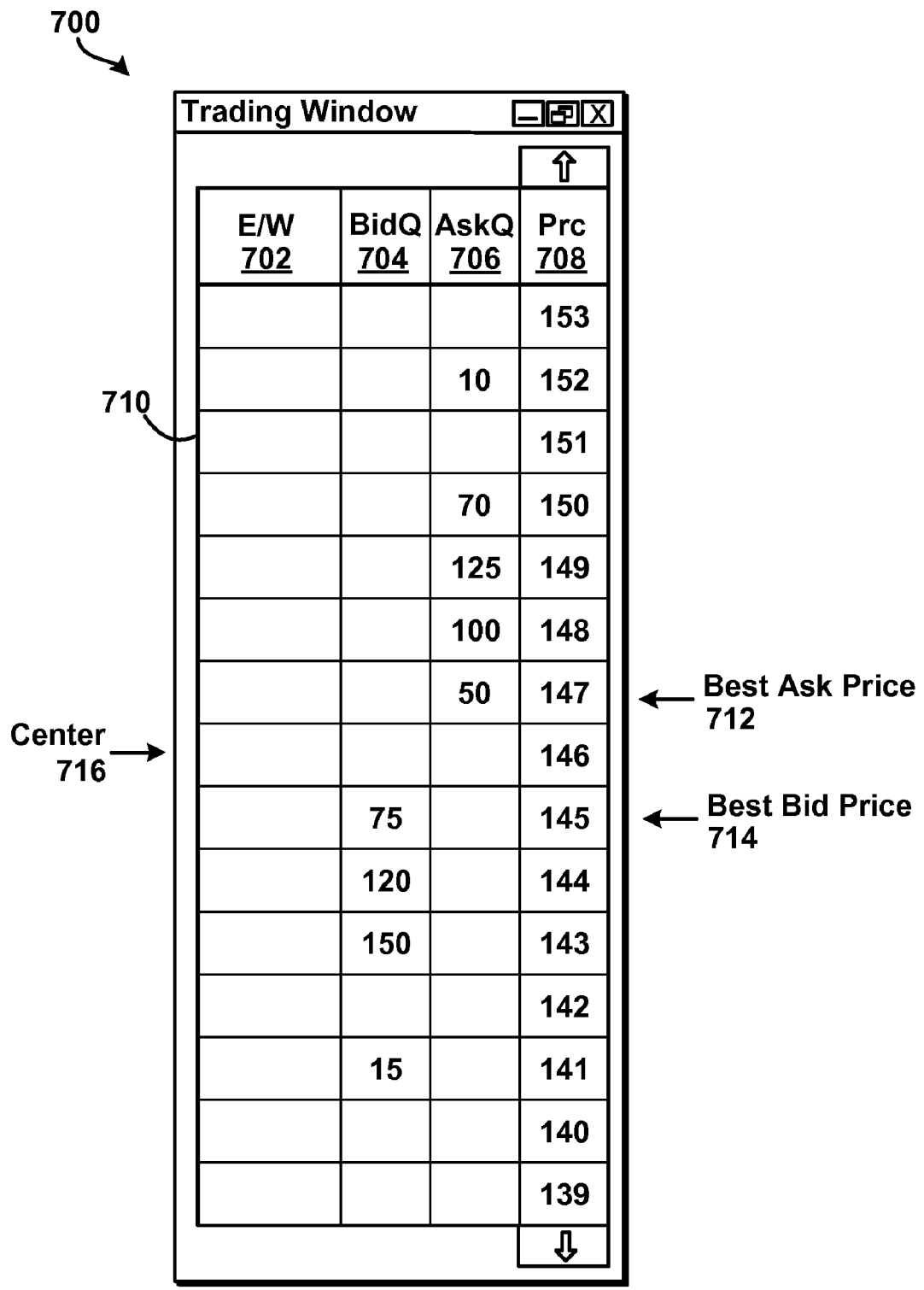
FIG. 7 shows an example trading interface with a price axis used in displaying market information wherein the inside market is currently centered in a display region.
Figure 8:
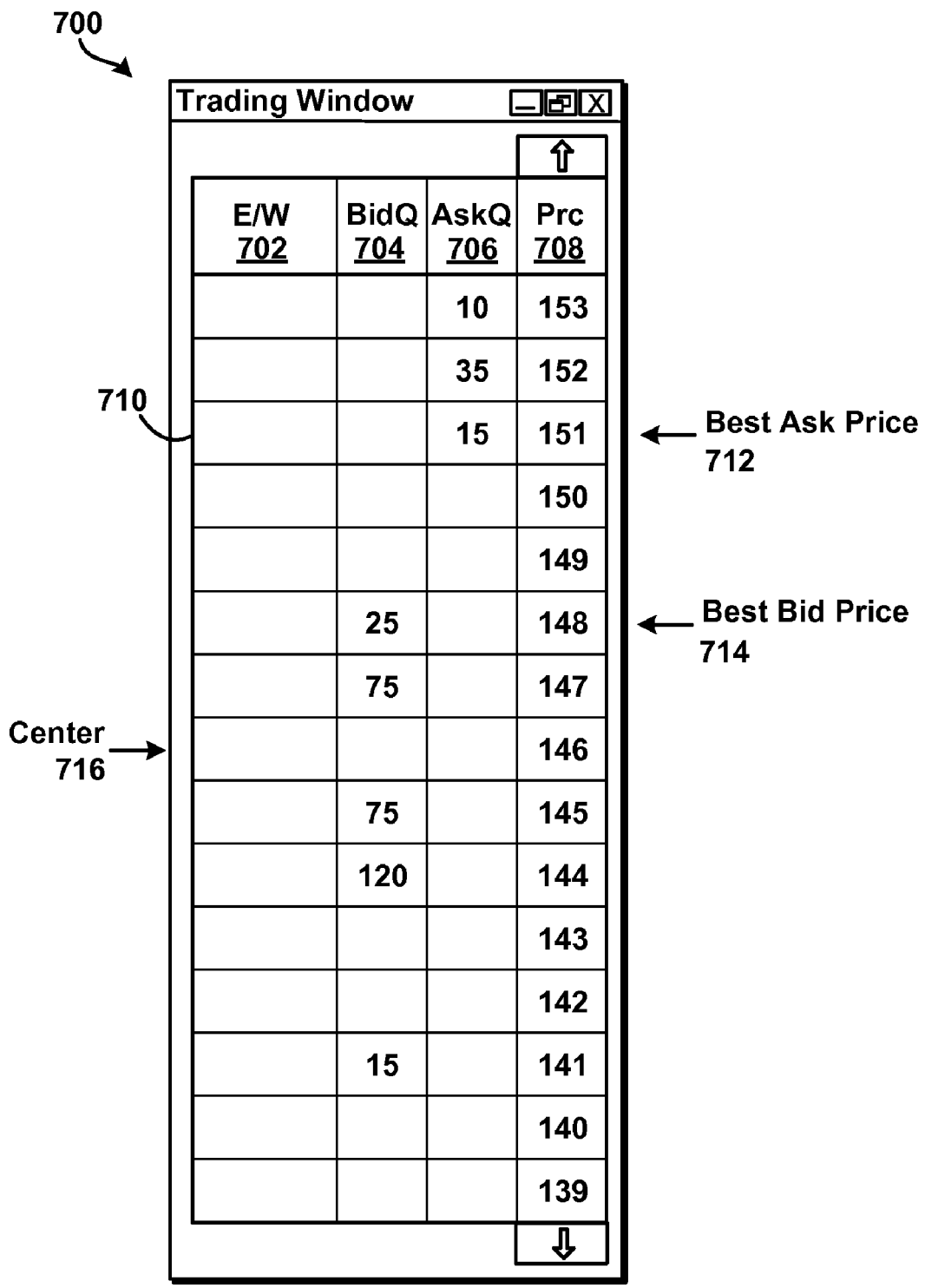
FIG. 8 shows the trading interface of FIG. 7, except that some time later the inside market has moved up in value and has moved along the price axis.
Figure 9:
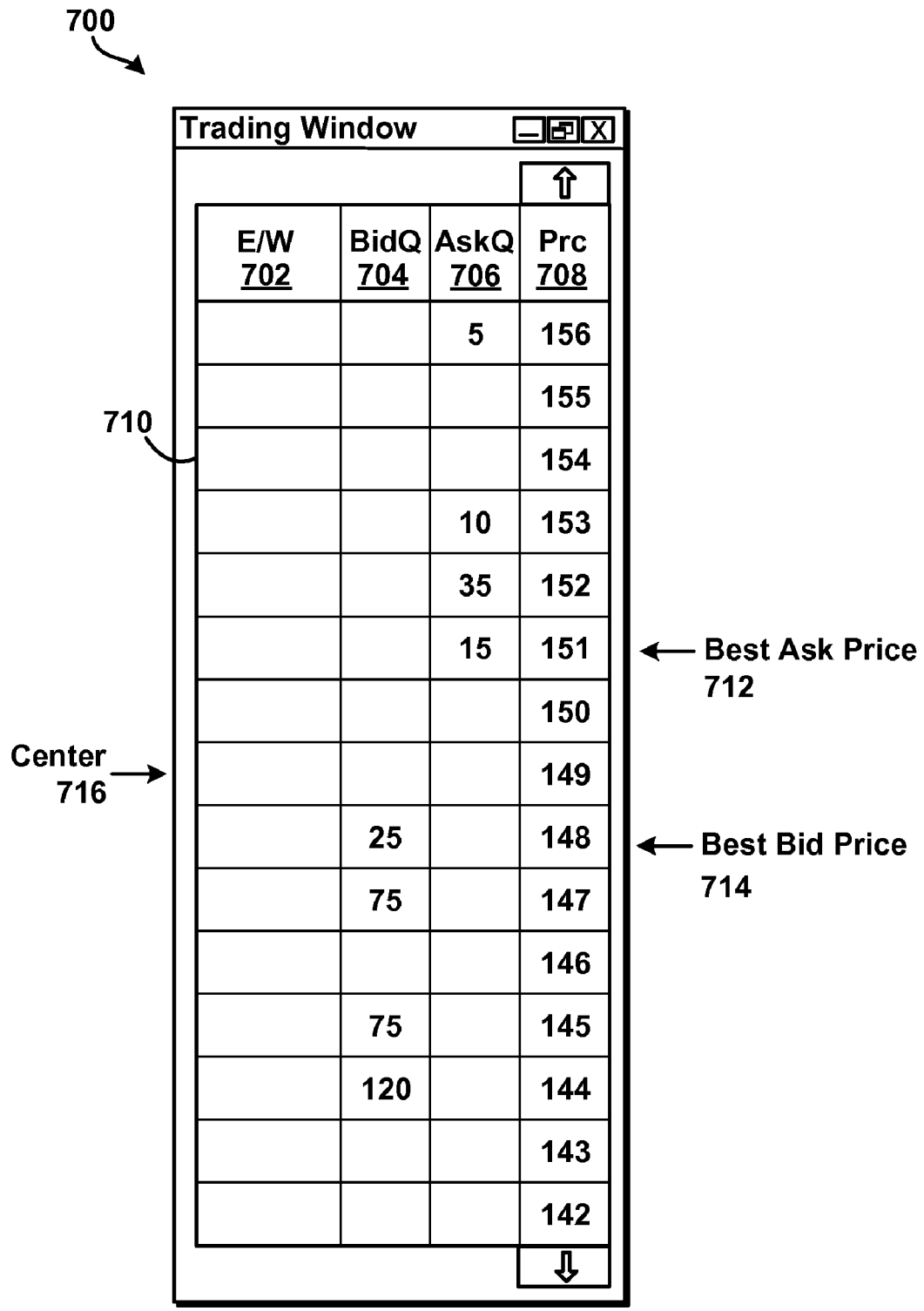
FIG. 9 shows the trading interface of FIG. 7, except that the inside market has been repositioned in the center or near the center of the display region.

This example illustrates when the event consists of the inside market moving outside a set limit. FIGS. 7-9 show a trading interface 700 for displaying market information along a price axis 708 in region 710. Of course, the limit can be set to any value, but for sake of illustration this example assumes a limit set at three ticks away from the top (or at the top $\frac{1}{5}^{th}$ of the region if the movement of the price axis is smooth and continuous like that shown in FIG. 6) and at three ticks away from the bottom (or at the bottom $\frac{1}{5}^{th}$ of the region if the movement of the price axis is smooth and continuous like that shown in FIG. 6). For this example, when one of the inside market prices moves outside of a limit, the price axis is repositioned. Another possible way to set limits include when the average of the inside market (the average of the best ask and the best bid) moves outside of either limit.

According to FIG. 7, the inside market and the quantities available at the inside market are centered, or near centered, in the display regions 704, 706 and 708. In other words, a portion of the price axis from price "139" to price "153" is viewed such that the current inside market price "145" and price "147" are displayed in the center or near center of their respective regions. Of course, the inside market may be repositioned to a designated location rather than centering, such as offsetting the inside market above or below the center of their regions.

FIG. 8 shows the trading interface 700 of FIG. 7, except that some time later, the inside market has moved up in value along the price axis to "148" and "151." At this instant the inside market is off-center and the best ask price has just moved outside of the pre-set limit. Therefore, a signal to reposition is initialized.

FIG. 9 shows the trading interface 700 of FIG. 7 with the same market information as shown in FIG. 8, except that the inside market has been re-centered so that inside market indicators are centered in display regions 704 and 706. According to the present embodiments, once the inside market reaches a designated location or becomes out of view in the display region 710, another portion of the price axis is shown in display region 710. In particular, prices from price "142" to price "156" are displayed so that the item of interest is centered in its region(s).

In another embodiment, the reposition operation does not necessarily center the inside market, but positions the market based on a predictive model. For example, using the previous market values, the price axis might be positioned so that the inside market is "off-center" to allow for more space on one side (e.g., buy side or sell side) for the market to continue to move in the direction predicted by the model.

The display of market information may be repositioned at a pre-determined rate. According to one embodiment, the pre-determined rate may be dynamically adjustable, based on a number of parameters (e.g., minimum rate while the inside market is on-screen, minimum rate while the inside market is off-screen, maximum rate while market is on-screen, maximum rate while market is off-screen, or the distance from the current position to the destination with a smooth rate destination.). Alternatively, the pre-determined rate is equal to some fixed, hard-coded rate. Regardless of whether the pre-determined rate is adjustable or fixed, it is preferred that the rate may be set slow enough relative to the movement caused by changes in the market such that the view of the market as a whole along the axis of prices is not disturbed to the trader. Being able to set the rate of repositioning to a slow rate is especially important if the item of interest experiences large and sudden changes. Under such circumstances, the slow repositioning may actually enhance the visualization of the market trend by allowing a trader to see the movement of the price axis at it is repositioned. In addition, sometimes it might be of little significance to set a slow rate especially if the item of interest experiences small changes.

C. Example 3

This example illustrates when the event consists of a moving average. According to FIG. 10, the moving average price is centered, or near centered, in the display region 1010. More particularly, a portion of the price axis from price "120" to price "134" is viewed in display region 1010 such that the current moving average price "127" is displayed in the center or near center. The moving average may be repositioned to a designated location rather than centering, such as offsetting the inside market above or below the center of display region 1010.

Figure 11:
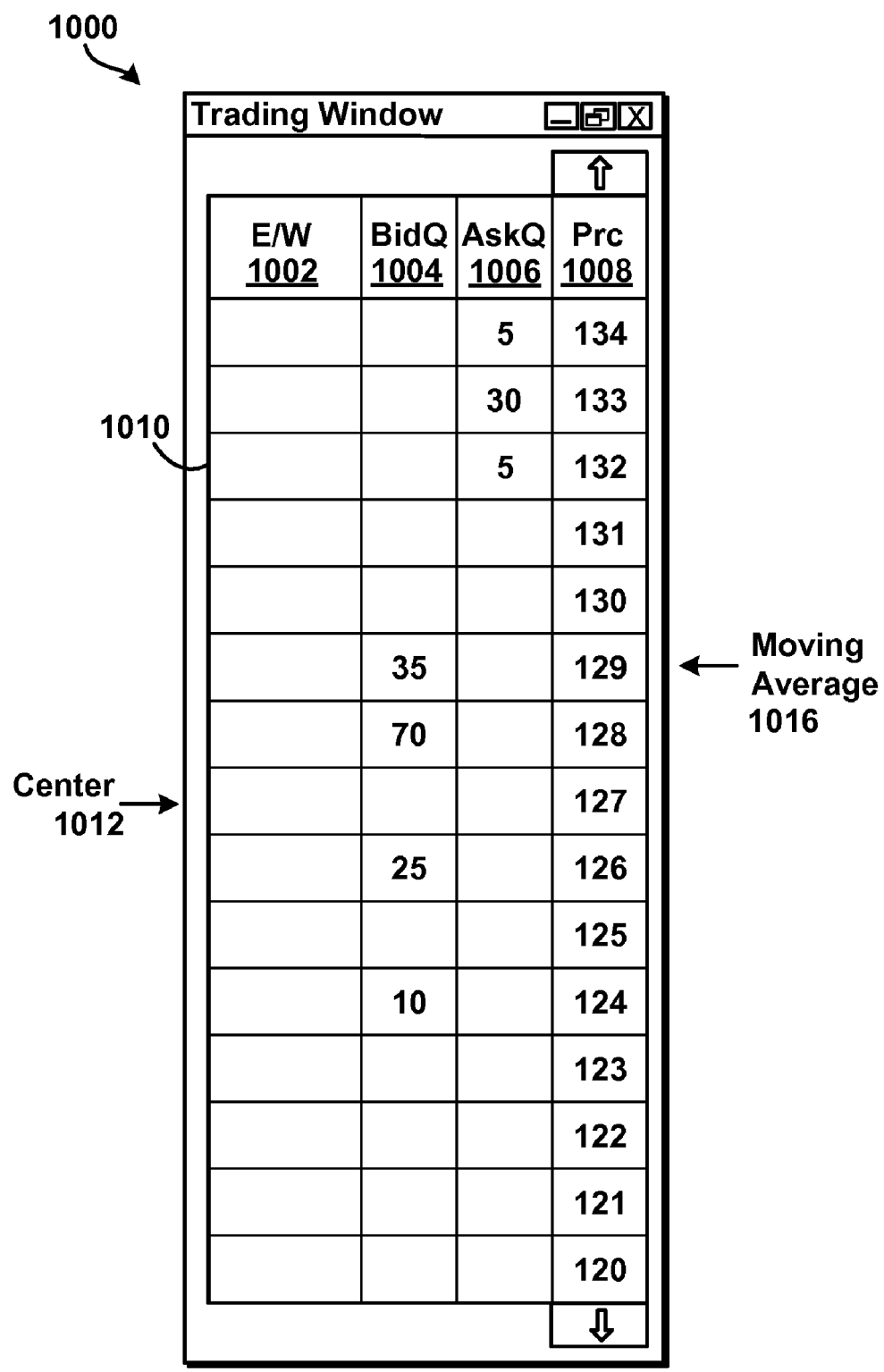
FIG. 11 shows the trading interface of FIG. 10, except that some time later the moving average has increased in value and has moved along the price axis.

FIG. 11 shows the trading interface 1000 of FIG. 10, except that some time later, the moving average has moved up in value along the price axis to "129." At this instant the inside market is off-center and has moved outside of the pre-set limit. Therefore, a signal to reposition is initialized.

Figure 12:
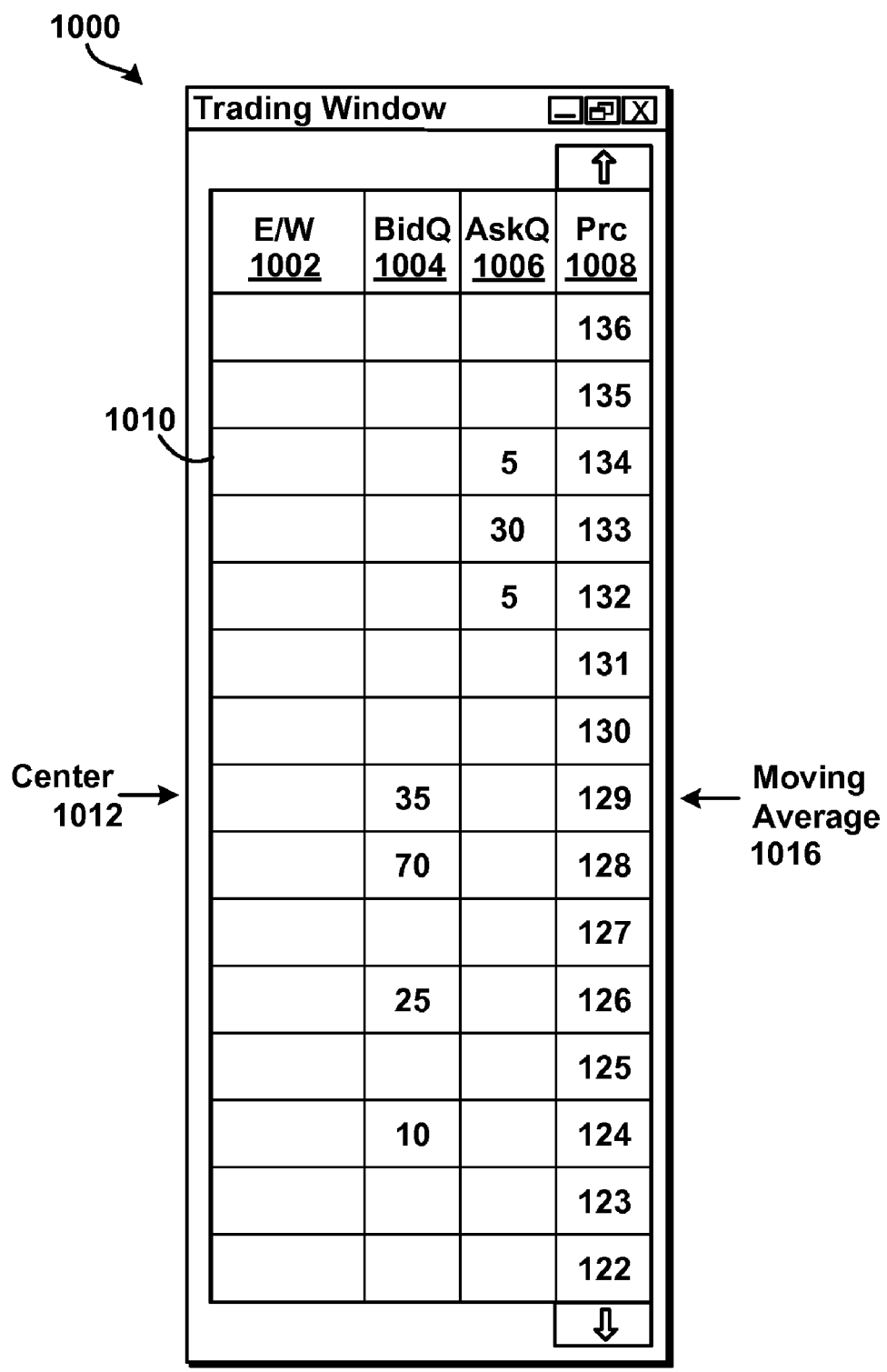
FIG. 12 shows the trading interface of FIG. 10, except that the moving average has been repositioned in the center or near the center of the display region.

FIG. 12 shows the trading interface 1000 of FIG. 10 with the same market information as shown in FIG. 11, except that the moving average has been re-centered in the display region 1010. According to the preferred embodiments, once the moving average reaches a designated location or becomes out of view in the display region 1010, another portion of the price axis is shown in display region 1010. In particular, prices from price "122" to price "136" are displayed in the center or near center.

According to the present embodiments, the repositioning rate may be set slow enough to augment the assimilation of market information by enhancing the movement in the movement according to some chose criteria or item of interest. For example, a trader would visualize the moving average moving up the price axis indicating that the moving average is increasing in value. Preferably, when the price axis is repositioned, the axis would slowly be repositioned such that the moving average would return to the center of the display. The trader would visually recognize the moving average has increased in value and can easily see the next change in moving average. Moreover, by centering around the moving average, for example, the trader would know if he or she is trading above or below the moving average by trading above or below the centered average.

IV. CONCLUSION

Assimilation of market information is important to the success of the trader. According to the preferred embodiments, market information is displayed relative to an axis of prices and the information is centered on the chosen item of interest. As market conditions move along the axis of prices, the display of market information may be repositioned, at a selected rate if so desired, around the item of interest. By centering market information around the item of interest, a trader may assimilate the market information more efficiently. In addition, the repositioning of the price axis may occur at some rate. The rate may be dynamically variable or fixed. The rate may range in speeds from instantaneously repositioning to very slow repositioning. Preferably, the rate may be set slow enough to augment the assimilation of market information by enhancing the movement in the market according to some chose criteria or item of interest.

The present embodiments utilize a price axis. Displaying market information in relation to a price axis allows for exceptional market feel and an intuitive sense of where the market is headed. By using a vertically aligned axis of prices, for example, when the inside market moves up in value, the inside market indicators move up the axis and the when the inside market moves down in value, the inside market indicators move down the axis. Of course, the price axis may be aligned in other directions besides vertically, such as horizontally, for example. As a result of moving along an axis, the preferred embodiments may be utilized to gradually and continuously reposition the price axis and the market information concurrently, so that a more desirable portion of the price axis and the market information can be viewed.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. Thus, all variations that come within the scope and spirit of the following claims and equivalents thereto are claimed as the invention.

What is claimed is:

1. A method for repositioning market information relating to a tradeable object being traded in a market on a graphical user interface, the method comprising:

displaying by a computer device a display region comprising a plurality of locations in alignment with a price axis for displaying market information relating to the tradeable object, wherein each location corresponds to a price level along the price axis;

identifying by the computer device an item of interest associated with a first price level;

detecting by the computer device a first change in value of the item of interest from the first price level to a second price level;

automatically repositioning the price axis and the plurality of locations in the display region a first time, based on the first change, wherein the second price level associated with the item of interest is automatically repositioned on the graphical user interface to a designated location in the display region;

detecting by the computer device a second change in value of the item of interest from the second price level to a third price level during the step of automatically repositioning the price axis based on the first change, and, before the second price level is positioned at the designated location based on the repositioning at the first time; and automatically repositioning the price axis and the plurality of locations in the display region a second time, based on the second change, wherein the third price level associated with the item of interest is automatically repositioned on the graphical user interface to the designated location in the display region.

2. The method of claim 1, wherein the item of interest represents any of the following: a best bid price, a best ask price, a moving average of the inside market, or a last traded price.

3. The method of claim 1, wherein the item of interest has a value based on a result of an expression in an equation.

4. The method of claim 1, wherein the item of interest comprises a user defined price indicator.

5. The method of claim 1, wherein the designated location is substantially centered in the display region.

6. The method of claim 1, wherein the designated location is off-centered in the display region.

7. The method of claim 1, wherein the graphical user interface displays price levels along the price axis.

8. The method of claim 1, wherein the price axis and the plurality of locations in the display region are automatically repositioned at a predetermined rate of repositioning.

9. The method of claim 8, wherein the predetermined rate of repositioning is in a range of speeds according to units of pixels per second.

10. The method of claim 9, wherein the predetermined rate of repositioning is in the range of speeds between 50 pixels per second and 200 pixels per second.

11. The method of claim 8, wherein the predetermined rate of repositioning is configured so that the price axis and the plurality of locations in the display region glide to the designated location in the display region.

12. The method of claim 8, wherein the predetermined rate of repositioning comprises a fixed rate of repositioning.

13. The method of claim 8, wherein the predetermined rate of repositioning comprises a variable rate that changes as the item of interest is being repositioned.

14. The method of claim 8, wherein the predetermined rate of repositioning depends on a location of the item of interest.

15. The method of claim 1, further comprising:
displaying, by the computer device, an order entry region comprising a plurality of locations for receiving commands to initiate trade orders, wherein each location of the order entry region corresponds to a price level along the price axis, and wherein each command initiates placement of a trade order responsive to selecting a location of the order entry region with a cursor of a user input device, wherein the trade order has an order price based on a price level corresponding to the selected location.

16. The method of claim 15, wherein the price axis and the plurality of locations in the display region are automatically repositioned at a predefined rate of repositioning that allows placing of the cursor of the user input device by a user over a desired location in the order entry region and selecting the desired location to initiate a trade order at a desired price level corresponding to the desired location as the item of interest is automatically repositioned to the designated location.

17. The method of claim 15, wherein selecting the location of the order entry region comprises selecting the location by a single action of the user input device to initiate the trade order at the price level corresponding to the selected location.

18. The method of claim 15, wherein selecting the location of the order entry region is a single click of the user input device.

19. The method of claim 15, wherein selecting the location of the order entry region is a double click of the user input device.

20. The method of claim 15, wherein selecting the location of the order entry region further sets a plurality of order parameters and sends the trade order at the price level corresponding to the selected location.

21. The method of claim 15, wherein the order entry region and the display region overlap.

22. A computer readable medium having stored therein instructions to execute a method for repositioning market information relating to a tradeable object being traded in a market on a graphical user interface, the method comprising:
displaying by a computer device a display region comprising a plurality of locations in alignment with a price axis for displaying market information relating to the tradeable object, wherein each location corresponds to a price level along the price axis;
identifying by the computer device an item of interest associated with a first price level;
detecting by the computer device a first change in value of the item of interest from the first price level to a second price level;
automatically repositioning the price axis and the plurality of locations in the display region a first time, based on the first change, wherein the second price level associated with the item of interest is automatically repositioned on the graphical user interface to a designated location in the display region;
detecting by the computer device a second change in value of the item of interest from the second price level to a third price level during the step of automatically repositioning the price axis based on the first change, and, before the second price level is positioned at the designated location based on the repositioning at the first time; and
automatically repositioning the price axis and the plurality of locations in the display region a second time, based on the second change, wherein the third price level associated with the item of interest is automatically repositioned on the graphical user interface to the designated location in the display region.

* * * * *